(12) United States Patent
Chatterjee et al.

(10) Patent No.: US 10,579,739 B2
(45) Date of Patent: Mar. 3, 2020

(54) METHOD AND SYSTEM FOR IDENTIFYING PLACES OF INTEREST IN A NATURAL LANGUAGE INPUT

(71) Applicant: WIPRO LIMITED, Bangalore (IN)

(72) Inventors: Arindam Chatterjee, Chandannagar (IN); Kartik Subodh Ballal, Pune (IN); Vijay Garg, Pune (IN)

(73) Assignee: Wipro Limited, Bangalore (IN)

( * ) Notice: Subject to any disclaimer, the term of this patent is extended or adjusted under 35 U.S.C. 154(b) by 49 days.

(21) Appl. No.: 15/916,636

(22) Filed: Mar. 9, 2018

(65) Prior Publication Data

US 2019/0228073 A1    Jul. 25, 2019

(30) Foreign Application Priority Data

Jan. 23, 2018  (IN) .............................. 201841002618

(51) Int. Cl.
| | |
|---|---|
| *G06F 17/20* | (2006.01) |
| *G06F 17/28* | (2006.01) |
| *G06N 5/02* | (2006.01) |
| *G06F 17/27* | (2006.01) |
| *G06F 17/21* | (2006.01) |
| *G06N 3/08* | (2006.01) |
| *G06F 16/35* | (2019.01) |
| *G06F 16/33* | (2019.01) |

(52) U.S. Cl.
CPC .......... *G06F 17/28* (2013.01); *G06F 16/3334* (2019.01); *G06F 16/3344* (2019.01); *G06F 16/35* (2019.01); *G06F 17/218* (2013.01); *G06F 17/271* (2013.01); *G06F 17/277* (2013.01); *G06F 17/278* (2013.01); *G06F 17/2715* (2013.01); *G06F 17/2755* (2013.01); *G06F 17/2785* (2013.01); *G06N 3/08* (2013.01); *G06N 5/022* (2013.01)

(58) Field of Classification Search
CPC ...... G06F 17/28; G06F 16/3334; G06F 16/35; G06F 16/3344; G06F 17/218; G06F 17/271; G06N 3/08; G06N 5/022
USPC .......................... 704/9, 10, 275; 1/1; 706/12
See application file for complete search history.

(56) References Cited

U.S. PATENT DOCUMENTS

| | | | |
|---|---|---|---|
| 7,716,056 B2 * | 5/2010 | Weng ...................... | G10L 15/22 704/275 |
| 8,874,432 B2 | 10/2014 | Qi et al. | |
| 8,914,279 B1 | 12/2014 | Petrov et al. | |
| 9,076,009 B2 * | 7/2015 | Sathish ................... | H04W 4/02 |

(Continued)

*Primary Examiner* — Md S Elahee
(74) *Attorney, Agent, or Firm* — Finnegan, Henderson, Farabow, Garrett & Dunner, LLP (57) ABSTRACT

Disclosed herein is method and system for identifying one or more Places of Interest (PoI) in a natural language system. Word embedding representation for each word in the natural language input are retrieved from a knowledge repository. Further, for each word, Part-of-Speech (POS) tags are tagged, and dependency labels are generated. Subsequently, a PoI tag is assigned to each word based on the word embedding representation, the POS and the dependency labels of each word. Finally, the one or more PoI are identified based on PoI tag assigned to each word. In an embodiment, the method of present disclosure helps in dynamically identifying one or more PoI from natural language text utterances in interactive systems, thereby enhancing usability of interaction based intelligent systems.

13 Claims, 4 Drawing Sheets

(56) References Cited

U.S. PATENT DOCUMENTS

| | | |
|---|---|---|
| 9,390,087 B1 | 7/2016 | Roux et al. |
| 9,639,601 B2 | 5/2017 | Proux |
| 9,690,772 B2 | 6/2017 | Brun et al. |
| 2015/0262078 A1* | 9/2015 | Sarikaya ................ G06N 20/00 706/12 |
| 2016/0357860 A1 | 12/2016 | Shmiel et al. |
| 2018/0231391 A1* | 8/2018 | Yang .................. G01C 21/3617 |
| 2019/0188260 A1* | 6/2019 | Hewitt ................ G06F 17/2785 |

* cited by examiner

METHOD AND SYSTEM FOR IDENTIFYING PLACES OF INTEREST IN A NATURAL LANGUAGE INPUT

TECHNICAL FIELD

The present subject matter is generally related to artificial intelligence and more particularly, but not exclusively, to a method and system for identifying one or more Places of Interest (PoI) in a natural language input.

BACKGROUND

Intelligent systems which use Natural Language Processing (NLP) and Natural Language Understanding (NLU) to interact with users/customers is a highly coveted requirement nowadays. Currently available intelligent systems, which use Artificial Intelligence (AI) to decipher user query content, are inclined to mine and identify the user intent. However, such intelligent systems appear too generic to be used for domain bound or domain-specific use cases, where the user intent is already known, and particular information which is more granular is required.

Further, mere detection of the user intent is not sufficient to identify specific details such as time, or particular Place(s) of Interest (PoI) from the user query. For example, the intelligent systems that are used in flight booking, hotel booking, and attendance handling are already aware of the user intent, and hence mining the user intent would not help in extracting the specific details from the user query.

Some of the existing systems for identifying locations from the user query use well-known NLP tools such as Named Entity Recognizer (NER). Unfortunately, in most cases, the NER identifies locations because they begin with upper case characters. Such criteria do not hold good for identifying PoI from the user queries, as the form/pattern of the PoI varies based on user intentions. As a result, the existing tools fail to recognize and extract PoI from natural language inputs, and hence do not accurately interpret where the user is and/or wants to be. Accurate recognition of PoI is immensely required in intelligent systems such as automated dialogue systems, hotel booking bots, travel itinerary retrieval systems, e-commerce conversation engine, and Intelligent Personal Assistants (IPAs) that take PoI as a crucial information/input.

The information disclosed in the background section of the disclosure is only for enhancement of understanding of the general background of the invention, and should not be taken as an acknowledgement or any form of suggestion that this information forms the prior art already known to a person skilled in the art.

SUMMARY

Disclosed herein is a method for identifying one or more Places of Interest (PoI) in a natural language input. The method comprises retrieving, by a natural language processing system, a word embedding representation for each word of one or more words in the natural language input from a knowledge repository associated with the natural language processing system. Further, the method comprises tagging each word with a corresponding Part-of-Speech (PoS). Thereafter, the method comprises generating a dependency label for each word based on a dependency parser tree for the natural language input. Furthermore, the method comprises assigning a PoI tag for each word based on the word embedding representation, the POS, and the dependency label corresponding to each word. Finally, the method comprises identifying the one or more PoI in the natural language input based on the PoI tag of each word Further, the present disclosure relates to a natural language processing system for identifying one or more Places of Interest (PoI) in a natural language input. The natural language processing system comprises a processor and a memory. The memory is communicatively coupled to the processor and stores processor-executable instructions, which on execution, cause the processor to retrieve a word embedding representation for each word of one or more words in the natural language input from a knowledge repository associated with the natural language processing system. Further, the instructions cause the processor to tag each word with a corresponding Part-of-Speech (PoS). The instructions also cause the processor to generate a dependency label for each word based on a dependency parser tree for the natural language input. Thereafter, the instructions cause the processor to assign a PoI tag for each word based on the word embedding representation, the POS, and the dependency label corresponding to each word. Finally, the instructions cause the processor to identify the one or more PoI in the natural language input based on the PoI tag of each word.

Furthermore, the present disclosure relates to a non-transitory computer readable medium including instructions stored thereon that when processed by at least one processor cause a natural language processing system to perform operations comprising retrieving a word embedding representation for each word of one or more words in the natural language input from a knowledge repository associated with the natural language processing system. Further, the processor causes the natural language processing system to tag each word with a corresponding Part-of-Speech (POS) and to generate a dependency label for each word based on a dependency parser tree for the natural language input. Furthermore, the processor causes the natural language processing system to assign a PoI tag for each word based on the word embedding representation, the POS, and the dependency label corresponding to each word. Finally, the processor cause the natural language processing system to identify the one or more PoI in the natural language input based on the PoI tag of each word.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF DRAWINGS

The accompanying drawings, which are incorporated in and constitute a part of this disclosure, illustrate exemplary embodiments and, together with the description, explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and regarding the accompanying figures, in which.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the specific forms disclosed, but on the contrary, the disclosure is to cover all modifications, equivalents, and alternative falling within the spirit and the scope of the disclosure.

The terms "comprises", "comprising", "includes", or any other variations thereof, are intended to cover a non-exclusive inclusion, such that a setup, device, or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

The present disclosure relates to a method and a natural language processing system for identifying one or more Places of Interest (PoI) in a natural language input. The natural language processing system may take as input, a natural language sentence or a group of sentences in natural language form, or even a document comprising natural language text, and may identify the places of interest in the input text or document.

In an embodiment, the input text may be broken down into individual sentences, and each sentence may be analyzed for identifying various parameters such as, Parts-of-Speech (POS), dependency labels, and word embedding representations. In an embodiment, values of each of these parameters form a feature set for an artificial neural network classifier. The neural network classifier may be a trained network configured in the natural language processing system, which is trained to identify the one or more PoI based on values in the feature set. The neural network classifier may classify each word as being a place of interest or otherwise, and returns an output text tagged with PoI tags.

Each word in the output text, obtained from the neural network classifier, may be analyzed based on the PoI tag assigned to each word for demarcating the one or more PoI in the input text.

In an embodiment, the method and the natural processing system disclosed in the present disclosure may help in enhancing usability of interaction based intelligent systems by dynamically identifying one or more PoI from natural language text utterances being fed to the interactive systems. Further, the method of present disclosure may be capable of automatically learning one or more words and semantic interpretations corresponding to each word across a huge set of natural language input samples. As a result, accuracy in identifying the PoI from the natural language inputs constantly improves over time.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

Figure 1:
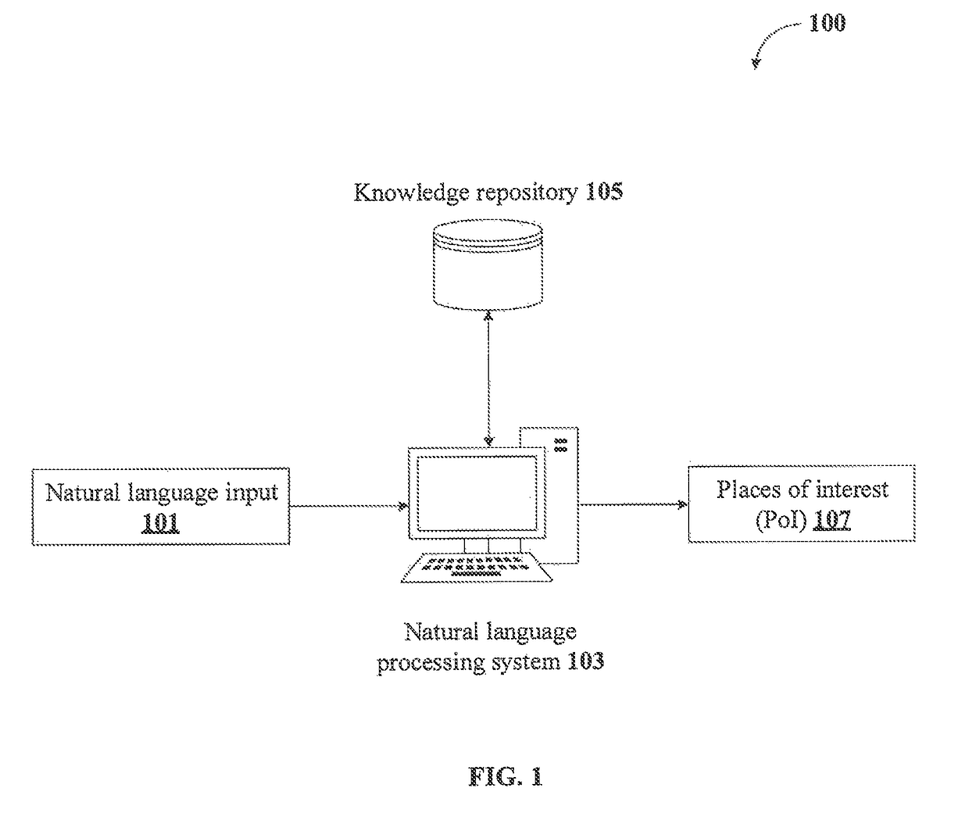
FIG. 1 illustrates an exemplary environment for identifying one or more Places of Interest (PoI) in a natural language input in accordance with some embodiments of the present disclosure.

FIG. 1 illustrates an exemplary environment 100 for identifying one or more Places of Interest (PoI) 107 in a natural language input 101 in accordance with some embodiments of the present disclosure.

The environment 100 may include a natural language processing system 103 that may be configured to receive a natural language input 101 and identify one or more Places of Interest (PoI) 107 in the natural language input 101. In an implementation, the natural language processing system 103 may be a stand-alone computing system such as a desktop computer, a laptop, a Personal Digital Assistant (PDA), a smartphone and the like, which may be capable of being configured to receive the natural language input 101 from a user, and identify one or more PoI 107 in the natural language input 101. In an alternative implementation, the natural language processing system 103 may be implemented as a sub-system to existing intelligent systems such as automated dialogue systems, hotel booking bots, travel itinerary retrieval systems, e-commerce conversation engine and the like. In such implementations, the natural language processing system 103 may receive the natural language input 101 from the hosting devices, as stated above, and return the one or more PoI 107, identified in the natural language input 101, to the hosting system. The natural language input 101 may be a single sentence, a group of sentences or any document containing natural language text.

In an embodiment, upon receiving the natural language input 101, the natural language processing system 103 may split the natural language input 101 into one or more words. Further, the natural language processing system 103 may retrieve word embedding representations for each word of one or more words in the natural language input 101 from a knowledge repository 105 associated with the natural language processing system 103. The knowledge repository 105 may store word embedding representations corresponding to various words, which may be obtained by training a word embedding classifier network in the natural language processing system 103 with a huge volume of natural language input 101 sample. In an embodiment, the knowledge repository 105 may be stored as a part of memory in the natural language processing system 103. Alternatively, the knowledge repository 105 may be a centralized repository, which is external to the natural language processing system 103. The knowledge repository 105 may be continuously trained with newer natural language input 101 samples to store word embedding representations corresponding to the one or more new words.

In an embodiment, the natural language processing system 103 may tag each word of the one or more words in the natural language input 101 with a corresponding Part-of-Speech (PoS) based on context of each word in the natural language input 101. Further, the natural language processing system 103 may generate a dependency label for each word based on a dependency parser tree for the natural language input 101. The dependency parser tree may be generated based on dependencies among each word in the natural language input 101.

In an embodiment, the natural language processing system 103 may assign a PoI tag for each word based on collated information, upon collating information related to the word embedding representations for each word, POS of each word, and the dependency label for each word in the natural language input 101. As an example, the PoI tag may be one of a Begin PoI tag, an Inside PoI tag, and a non-PoI tag. The Begin PoI tag may be assigned to a word that indicates beginning of a PoI 107 in the natural language input 101. The Inside PoI tag may be assigned to one or more words, which are successive to the beginning of the PoI 107. Similarly, the non-PoI tag may be assigned to the one or more words that do not indicate either beginning of the PoI 107 or any phrase related to the PoI 107. Finally, the natural language processing system 103 may identify the one or more PoI 107 in the natural language input 101 based on the PoI tag assigned for each word.

Figure 2:
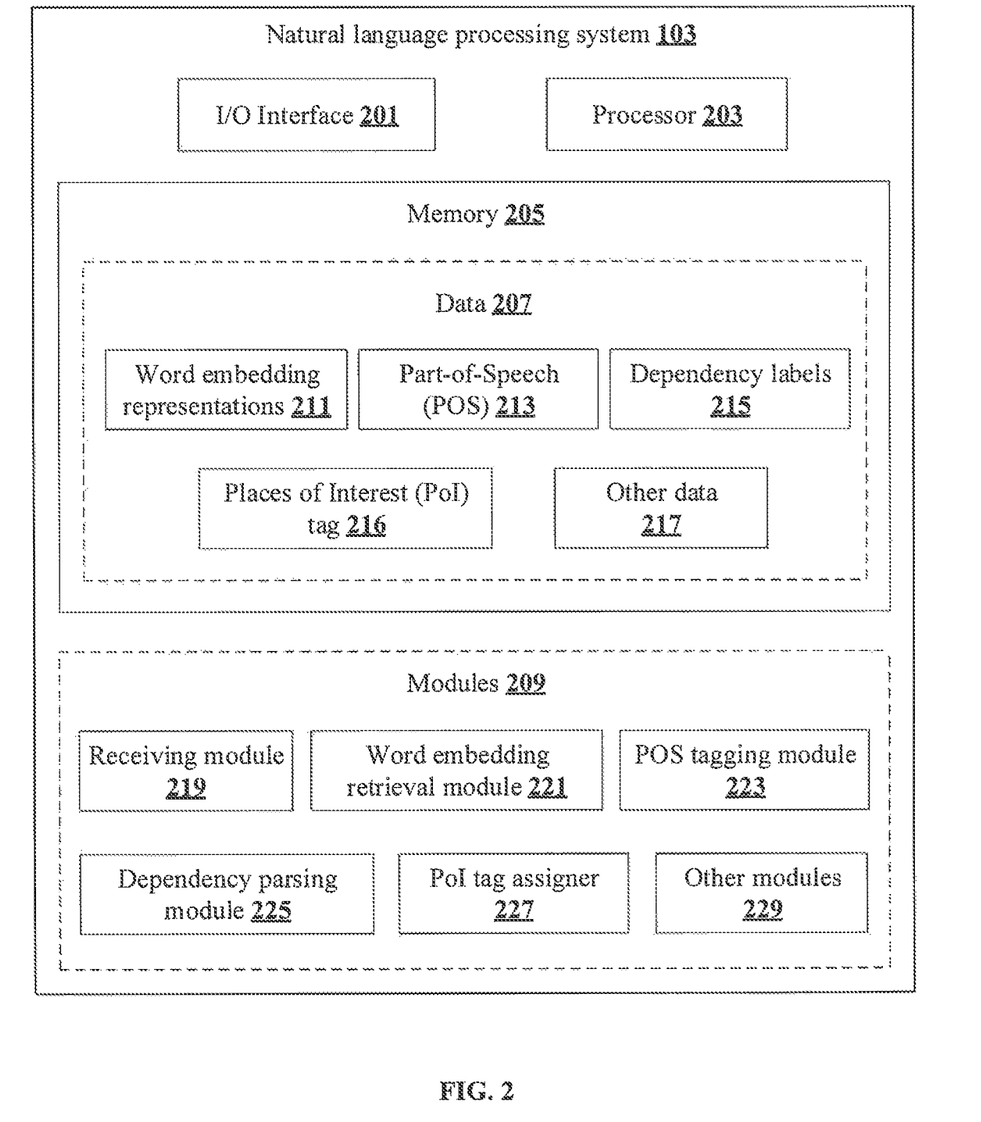
FIG. 2 shows a detailed block diagram illustrating a natural language processing system in accordance with some embodiments of the present disclosure.

FIG. 2 shows a detailed block diagram illustrating a natural language processing system 103 in accordance with some embodiments of the present disclosure.

The natural language processing system 103 may include an I/O interface 201, a processor 203, and a memory 205. The I/O interface 201 may be configured to communicate with a user, through one or more electronic devices and/or one or more user interfaces associated with the user, for receiving a natural language input 101 from the user and/or other computing systems. Further, the I/O interface 201 may be used to communicate one or more PoI 107, identified in the natural language input 101, to the user and/or other computing devices associated with the natural language processing system 103. The memory 205 may be communicatively coupled to the processor 203. The processor 203 may be configured to perform one or more functions of the natural language processing system 103 for identifying the one or more PoI 107 in the natural language input 101.

In some implementations, the natural language processing system 103 may include data 207 and modules 209 for performing various operations in accordance with the embodiments of the present disclosure. In an embodiment, the data 207 may be stored within the memory 205 and may include information related to, without limiting to, word embedding representations 211, Part-of-Speech (POS) 213, dependency labels 215, Place of Interest (PoI) 107, and other data 217.

In an embodiment, the word embedding representations 211 provide semantic and syntactic significance of each word, with respect to context of each word in the natural language input 101. The word embedding representations 211 may be representations of a word in a low-dimensional vector space. The word embedding representations 211 may be helpful in understanding and handling one or more new words in the natural language input 101 that were unseen or are being encountered for the first time by the natural language processing system 103.

For example, consider a case where the word 'Home' is used during training of the neural network classifier, and the neural network classifier is trained to detect the word 'home' as a PoI 107. Now, when the neural network classifier encounters a new word such as 'Abode', the classifier may classify the word 'Abode' as a PoI 107. This is because, the word embedding representations 211 or the vector representation of the words 'Home' and 'Abode' have similar representations in the corresponding vector space. Therefore, since the neural network classifier is already trained to detect the word 'Home' as a PoI 107, the would 'Abode' would also be treated as a PoI 107.

In an embodiment, for generating the word embedding representations 211, the neural network classifier may be trained using each word from a sample natural language input. After the training, output from the neural network classifier may be context of the word within a predetermined window size, for example, within a window size of 10. The predetermined window size may be an average of number of words in each sentence of the sample natural language input used for training the neural network classifier. As a result, the word embedding representations 211 for each word would be represented by the context of the word in its vicinity. Hence, the word embedding representations 211 for the words, which appear in similar contexts in the natural language input 101 sample would be similar.

In an embodiment, the sample natural language input may be collected in the form of raw text, containing large number of natural language sentences. In order to produce accurate results, the sample natural language input used for training needs to be as diversified as possible. This increases the span and variance of the training data, thereby reducing chances of encountering a completely new word in the natural language input 101. Further, the raw corpus stored in the knowledge base may be a set of documents or articles that are as generic as possible, as in news and blogs, that cover information related to almost all the domains.

In an embodiment, the Part-of-Speech (POS) 213 of each word may be identified based on the syntactic function of the word in the natural language input 101. As an example, for a sentence: "L want to go home", the POS 213 tagging may be performed as shown below:

Input sentence: "I want to go home"
POS tagged sentence: "I (PRP) want (VB) to (PRP) go (VB) home (NN)"
Where,
'VB' indicates a Verb; 'PRP' indicates a Preposition, and 'NN' indicates a Noun.

In an embodiment, the dependency label 215 for each word may be generated based on a dependency parser tree for the natural language input 101. The dependency parser tree may be generated based on intrinsic dependencies among each word in the natural language input 101. As an example, the dependency parser tree may be used to identify a subject of the natural language input 101, main verbs and predicate/object in the natural language input 101.

In an embodiment, each word of the one or more words in the natural language input 101 may be assigned with an appropriate PoI tag 216 based on the word embedding representation, the POS 213, and the dependency label corresponding to each word. The PoI tag 216 may be one of a Begin PoI tag, an Inside PoI tag, and a non-PoI tag. For example, for an input sentence—"I want to go to a restaurant, find one near my house" may be as shown below:

Input sentence: "I want to go to a restaurant, find one near my house"

PoI tagged sentence: I (N-PoI) want (N-PoI) to (N-PoI) go (N-PoI) to (N-PoI) a (N-PoI) restaurant (B-PoI), find (N-PoI) one (N-PoI) near (B-PoI) my (I-PoI) house (I-PoI)

Where,

'N-POI' tag indicates a Place of non-interest or Not a PoI 107;

'B-POI' tag indicates beginning of a PoI 107; and

'I-POI' tag indicates inside the PoI 107;

In some embodiments, the data 207 may be stored within the memory 205 in the form of various data structures. Additionally, the data 207 may be organized using data models, such as relational or hierarchical data models. The other data 217 may store data, including the natural language input 101, the dependency parser tree, and other temporary data and files generated by one or more modules 209 for performing various functions of the natural language processing system 103.

In an embodiment, each of the data 207 stored in the natural language processing system 103 may be processed by one or more modules 209 of the natural language processing system 103. In one implementation, the one or more modules 209 may be stored as a part of the processor 203. In another implementation, the one or more modules 209 may be communicatively coupled to the processor 203 for performing one or more functions of the natural language processing system 103. The modules 209 may include, without limiting to, a receiving module 219, a word embedding retrieval module 221, a POS tagging module 223, a dependency parsing module 225, a PoI tag assigner 227, and other modules 229.

As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality. In an embodiment, the other modules 229 may be used to perform various miscellaneous functionalities of the natural language processing system 103. It will be appreciated that such modules 209 may be represented as a single module or a combination of different modules.

The receiving module 219 may be used for receiving the natural language input 101 from a user, and/or a computing system associated with the natural language processing system 103. In an embodiment, the natural language input 101 may be received in various forms including, a text input, a speech or voice based input and the like. Alternatively, the receiving module 219 may receive the natural language input 101 from a Natural Language Understanding (NLU) engine associated with the natural language processing system 103. The NLU engine may be a computing unit configured to understand each text in the natural language input 101 by deciphering the content, intent and several other granular details from the natural language input 101. As an example, the NLU engine may include, without limiting to, search engines, chat bots, question answering systems, conversation engines, intelligent personal assistants, data mining tools and the like.

In an embodiment, the receiving module 219 may be configured to work as a sentence disburser, wherein the receiving module 219 appropriately breaks down raw natural language input 101 into multiple sentences. Upon breaking down the raw sentences into multiple, simpler sentences, the receiving module 219 may disburse each simpler sentence for subsequent processing and analysis.

In an embodiment, the word embedding retrieval module 221 may be configured to retrieve word embedding representations 211 for each word of the one or more words in the natural language input 101 from the knowledge repository 105. The word embedding retrieval module 221 may analyze entire corpora of the natural language input 101, and may retrieve the word embedding representation for every word from the knowledge repository 105. More specifically, the word embedding retrieving module maps each word in the natural language input 101 with a corresponding vector representation of the word in a pre-predetermined vector space of the word in the knowledge repository 105. Further, the mapped vector representations of the words may be used to capture notion of the syntactic and semantic features of the word in a particular context of the natural language input 101.

In an embodiment, the word embedding retrieval module 221 may be configured with one or more predetermined techniques such as 'Word2vec' or 'GloVe' for retrieving the word embedding representations 211.

In an embodiment, the POS tagging module 223 may be used for tagging each word in the natural language input 101 with a corresponding POS 213. The POS tagging module 223 may assign a POS 213 tag for each word and punctuation in the natural language input 101 based on context of each word in the natural language input 101.

In an embodiment, the dependency parsing module 225 may be used for generating the dependency labels 215 for each word based on a dependency parser tree for the natural language input 101. The dependency parser tree may be generated based on intrinsic dependencies among each word in the natural language input 101. The dependency parsing module 225 may analyze the grammatical structure of the natural language input 101 for establishing a relationship between "head" words and "non-head" words in the dependency parser tree. The "head" words may be indicative of the subject and/or significant words in the natural language input 101, and "non-head" words may be the words that modify intent of the "head" words. For example, consider an input sentence—"I saw a white elephant in my dreams".

Here, the dependency parser tree generated for the given input sentence may be as shown below:

Parser Tree:

(ROOT
  (S
    (NP (PRP I))
    (VP (VBD saw)
      (NP (DT a) (JJ white) (NN elephant))
      (PP (IN in)
        (NP (PRP$ my) (NNS dreams))))))

Dependency Labels:
nsubj (saw-2, I-1)
root (ROOT-0, saw-2)
det (elephant-5, a-3)
amod (elephant-5, white-4)
dobj (saw-2, elephant-5)
case (dreams-8, in-6)
nmod:poss (dreams-8, my-7)
nmod (saw-2, dreams-8)

In an embodiment, the dependency labels 215 for each word may be generated based on "head" word corresponding to each word. For example, the dependency label 'nsubj (saw-2, I-1)' implies that, the word "I" is the subject of the input sentence, and its "head" word is the verb "saw". Similarly, the dependency labels 215 may be generated for each word in the natural language input 101.

In an embodiment, the PoI tag assigner 227 may be used to assign the PoI tag 216 for each word based on the word embedding representation, the POS 213, and the dependency label corresponding to each word. In other words, the PoI tag assigner 227 takes the natural language input 101, along with corresponding word embedding representations 211, POS 213, and dependency labels 215 for each word, and assigns one of the PoI tag 216—B-PoI, I-PoI or N-PoI to each word.

In an embodiment, the PoI tag assigner 227 may be configured with an artificial neural network classifier. The artificial neural network classifier may be trained using a feature set comprising information related to the POS word embedding representations 211, the POS 213 and the dependency labels 215 corresponding to the sample natural language input. The PoI tag assigner 227 may assign the PoI tag 216 for each word in the natural language input 101 using the trained artificial neural network classifier.

The feature set for training the artificial neural network classifier may be obtained based on the following considerations:

POS Tags:

In the natural language input 101, the POS 213 of each word may depend on the context of the previous words. Hence, the POS 213 for the previous two words may be used as an essential feature, along with the POS 213 of the current word. For example, for a word 'W' with POS tag ($X_i$), the POS 213 feature set may include POS 213 tags of two words that are preceding to the word 'W', i.e. ($X_{i-1}$, $X_i$ and $X_{i-2}$). Hence, for each word, there would be a vector—($X_{(i-2)}$, $X_{(i-1)}$ and $X_{(i)}$).

Word Embeddings:

For handling the one or more new words, which are being encountered for the first time, an overview of the semantics and context of the natural language input 101 may be necessary. The word embedding representations 211 may be useful for understanding such new words in the natural language input 101.

For example, consider that the word 'Hotel' is already encountered by the neural network classifier. Now, when the neural network classifier encounters a new word such as, 'Restaurant', which is not in the training sample, it may be necessary to concatenate the input vector with the corresponding word embedding representation. As a result, the word embedding representation for the word "Hotel" is considered to be similar to that of the word "Restaurant", since both the words—"Hotel" and "Restaurant" would appear in similar contexts of the natural language input 101.

Similarly, a word embedding representation of a "head" word of the new word may be considered from the dependency parse tree of the natural language input 101 for retrieving the word embedding representation corresponding to the new word.

Dependency Labels:

The dependency labels 215 of each word may be used to understand the role of each word in the natural language input 101. In the feature set, the dependency label for a word 'W' may be denoted by the $D_w$.

As a result, the feature set, which is an input vector for training the artificial neural network classifier, such as an artificial neural network with Rectified Liner Units (RELU) may be as shown below:

$$(X_{i-2}, X_{i-1}, X_i, W_i, W_h, D_i)$$

Wherein, $X_i$—indicates POS 213 tag of a target word;

$X_{i-2}$ and $X_{i-1}$ indicate POS 213 tags of two words prior to the target word;

D indicates the dependency label for the target word;

$W_i$ indicates word embedding representation of the target word; and $W_h$ indicates word embedding representation of a "Head" word in the dependency parse tree.

In an embodiment, a feed-forward vector provided to the artificial neural network classifier may be represented by the following equation:

$$F = W[X_{i-2}, X_{i-1}, X_i, W_i, W_h, D_i]^T + b^{(1)}$$

$$h = g(U^T a + b^{(2)})$$

$$a = f(z)$$

Wherein,

W and U indicate the parameters associated with the neural network classifier;

$b^{(1)}$ and $b^{(2)}$ are the biases; and f and g are the functions of RELU and SoftMax respectively.

In an embodiment, a back-propagation technique may be used to train the parameters of the artificial neural network classifier and the biases $b^{(s)}$ with a loss function as categorical cross-entropy. Further, a Stochastic Gradient Descent may be used for gradient learning with Adaptive Momentum optimization.

In an embodiment, upon assigning the PoI tag 216 for each word in the natural language input 101, the PoI tag assigner 227 may classify each word in the natural language input 101 based on the PoI tag 216 for identifying the one or more PoI 107 from the natural language input 101. Identification of the one or more PoI 107 based on the PoI tag may be explained with the following example:

Input sentence: "I want to go to a restaurant, near my house"

PoI tagged Input sentence: I (N-PoI) want (N-PoI) to (N-PoI) go (N-PoI) to (N-PoI) a (N-PoI) restaurant (B-PoI), (N-PoI) near (B-PoI) my (I-PoI) house (I-PoI)

Here, only those words which are assigned with (B-PoI) and (I-PoI) may be considered as the PoI 107 in the input sentence.

i.e. the PoI identified in the Input sentence: {"restaurant", "near my house"}

In an embodiment, the one or more PoI 107 identified from the natural language input 101 may be returned to one or more interaction based intelligent systems such as automated dialogue systems, hotel booking bots, travel itinerary retrieval systems, e-commerce conversation engine, and Intelligent Personal Assistants (IPAs), for providing accurate responses to user queries.

Figure 3:
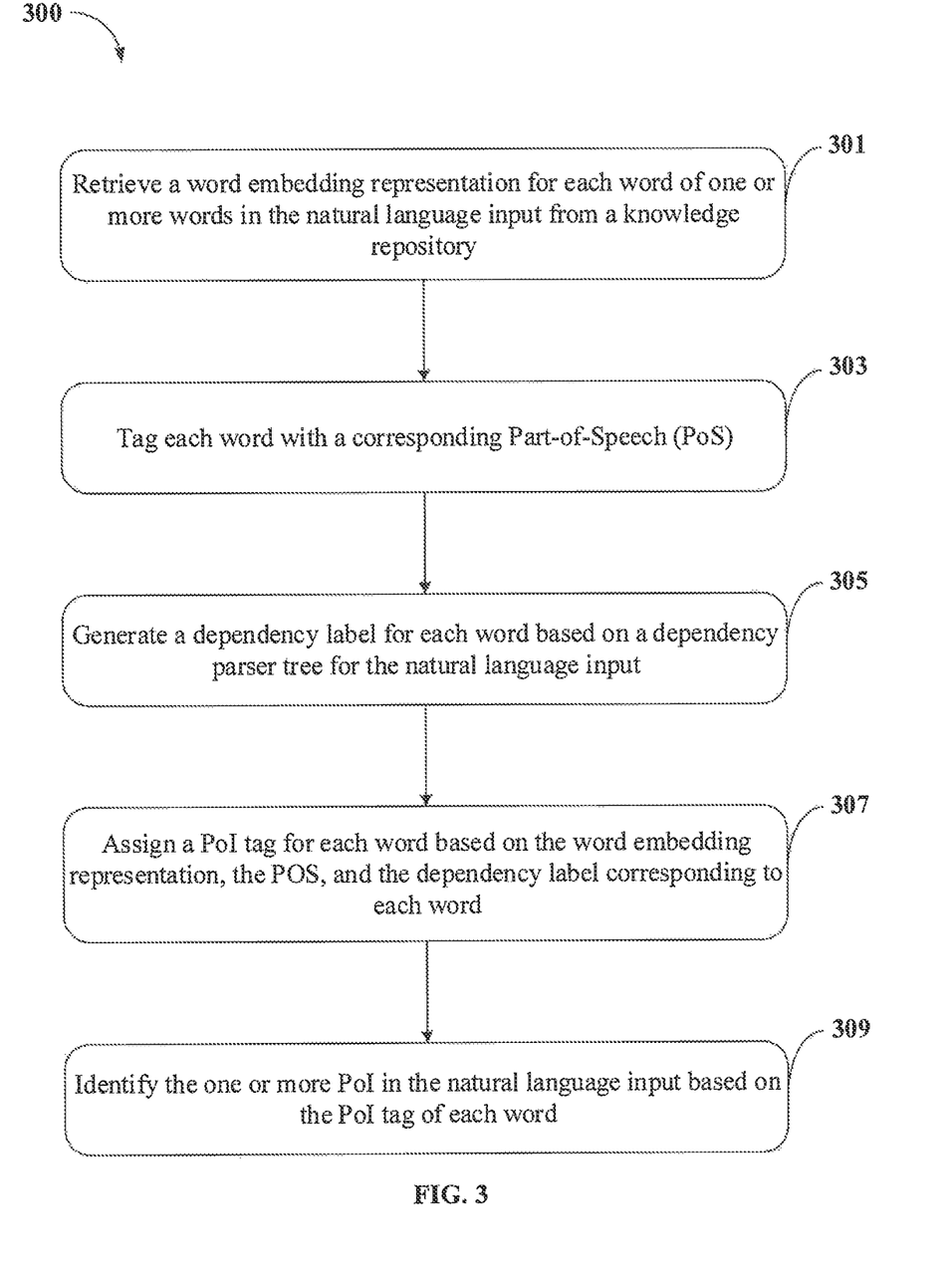
FIG. 3 shows a flowchart illustrating a method for identifying one or more Places of Interest (PoI) in a natural language input in accordance with some embodiments of the present disclosure.

FIG. 3 shows a flowchart illustrating a method for identifying one or more PoI 107 in a natural language input 101 in accordance with some embodiments of the present disclosure.

As illustrated in FIG. 3, the method 300 includes one or more blocks illustrating a method for identifying the one or more PoI 107 in the natural language input 101 using a natural language processing system 103 for example, the natural language processing system 103 shown in FIG. 1. The method 300 may be described in the general context of computer executable instructions. Generally, computer executable instructions can include routines, programs, objects, components, data structures, procedures, modules, and functions, which perform specific functions or implement specific abstract data types.

The order in which the method 300 is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

At block 301, the method 300 includes retrieving, by the natural language processing system 103, a word embedding representation for each word of one or more words in the natural language input 101 from a knowledge repository 105 associated with the natural language processing system 103. In an embodiment, the word embedding representation may help in deriving semantic and syntactic significance of each word with respect to context of each word in the natural language input 101.

At block 303, the method 300 includes tagging, by the natural language processing system 103, each word with a corresponding Part-of-Speech (POS) 213. In an embodiment, POS 213 tagging may be performed based on context of usage of each word in the natural language input 101.

At block 305, the method 300 includes generating, by the natural language processing system 103, a dependency label for each word based on a dependency parser tree for the natural language input 101. In an embodiment, the dependency parser tree may be generated based on dependencies among each word in the natural language input 101.

At block 307, the method 300 includes assigning, by the natural language processing system 103, a PoI tag 216 for each word in the natural language input 101. In an embodiment, the PoI tag 216 may be assigned based on the word embedding representation, the POS 213, and the dependency label corresponding to each word. In an implementation, assigning the PoI tag 216 for each word may be performed using an artificial neural network classifier configured in the natural language processing system 103.

In an embodiment, the artificial neural network classifier must be trained for identifying the one or more PoI 107 in the natural language input 101. As an example, the artificial neural network classifier may be trained by collating various natural language input 101 samples, and then associating each word in the natural language input 101 samples with corresponding PoI tags 216. Subsequently, the PoI tags 216 associated with each word may be provided as an input to the neural network classifier for training the neural network classifier.

At block 309, the method 300 includes identifying, by the natural language processing system 103, the one or more PoI 107 in the natural language input 101 based on the PoI tag 216 of each word. The PoI 107 may be one of a Begin PoI tag, an Inside PoI tag, and a non-PoI tag. The Begin PoI tag may be assigned to a word which indicates beginning of a PoI 107 in the natural language input 101. The Inside PoI tag may be assigned to one or more words, which are successive to the beginning of PoI 107. Similarly, the non-PoI tag may be assigned to the one or more words that do not indicate either beginning of a PoI 107 or any part of the PoI 107. Therefore, a word—'W' in the natural language input 101 may be identified as a PoI 107, only when the word 'W' has been assigned with a 'Begin' PoI tag or a 'Inside' PoI tag.

Computer System

Figure 4:
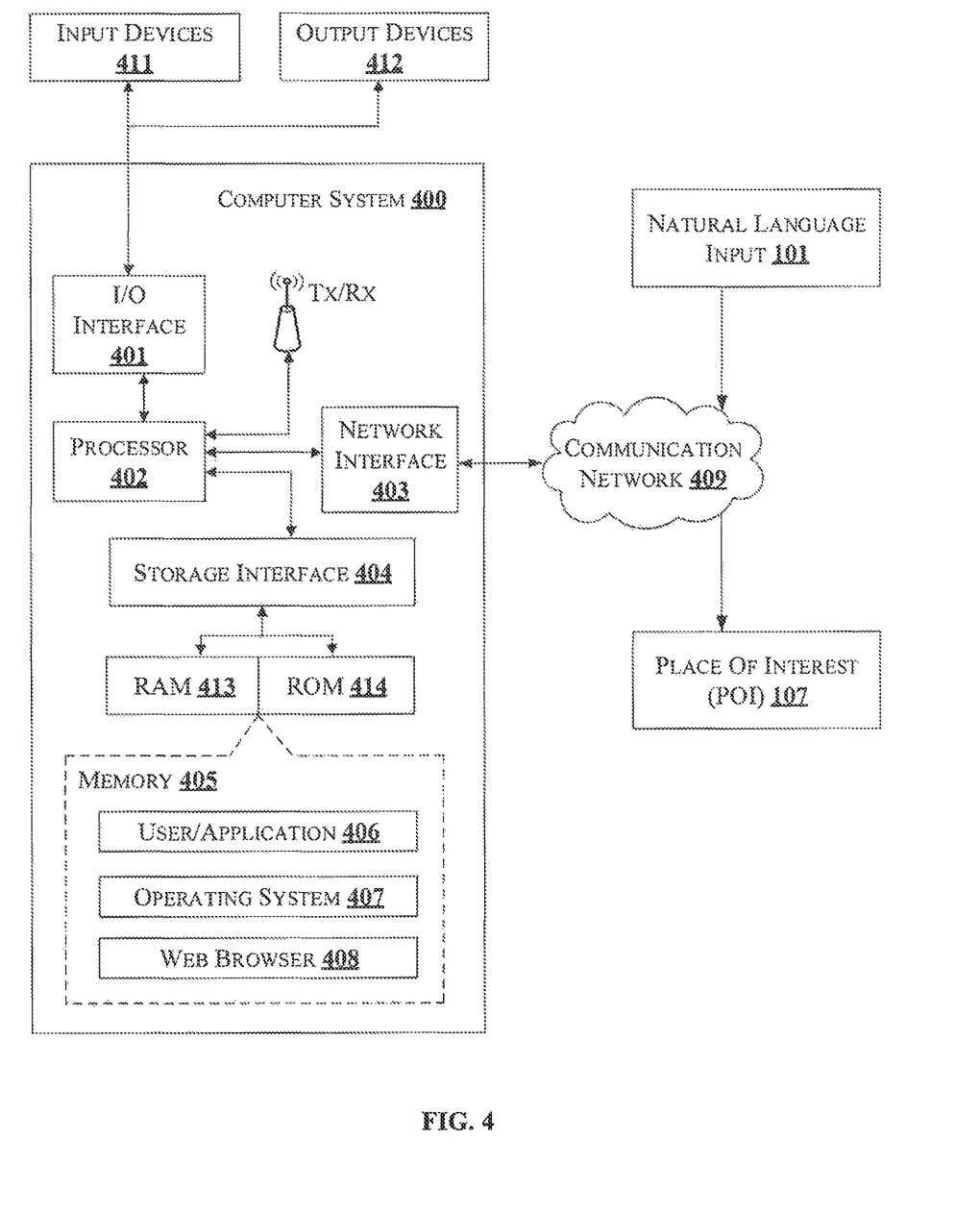
FIG. 4 illustrates a block diagram of an exemplary computer system for implementing embodiments consistent with the present disclosure.

FIG. 4 illustrates a block diagram of an exemplary computer system 400 for implementing embodiments consistent with the present disclosure. In an embodiment, the computer system 400 may be natural language processing system 103, which may be used for identifying one or more Places of Interest (PoI) 107 in a natural language input 101. The computer system 400 may include a central processing unit ("CPU" or "processor") 402. The processor 402 may comprise at least one data processor for executing program components for executing user- or system-generated business processes. A user 103 may include a person, a user 103 in the computing environment 100, a user 103 of the natural language processing system 103, or any system/sub-system being operated parallelly to the natural language processing system 103. The processor 402 may include specialized processing units such as integrated system (bus) controllers, memory management control units, floating point units, graphics processing units, digital signal processing units, etc.

The processor 402 may be disposed in communication with one or more input/output (I/O) devices (411 and 412) via I/O interface 401. The I/O interface 401 may employ communication protocols/methods such as, without limitation, audio, analog, digital, stereo, IEEE-1394, serial bus, Universal Serial Bus (USB), infrared, PS/2, BNC, coaxial, component, composite, Digital Visual Interface (DVI), high-definition multimedia interface (HDMI), Radio Frequency (RF) antennas, S-Video, Video Graphics Array (VGA), IEEE 802.n/b/g/n/x, Bluetooth, cellular (e.g., Code-Division Multiple Access (CDMA), High-Speed Packet Access (HSPA+), Global System For Mobile Communications (GSM), Long-Term Evolution (LTE) or the like), etc. Using the I/O interface 401, the computer system 400 may communicate with one or more I/O devices 411 and 412. In some implementations, the I/O interface 401 may be used to connect to a user device, such as a smartphone, a laptop, or a desktop computer associated with the user 103, through which the user 103 interacts with the natural language processing system 103.

In some embodiments, the processor 402 may be disposed in communication with a communication network 409 via a network interface 403. The network interface 403 may communicate with the communication network 409. The network interface 403 may employ connection protocols including, without limitation, direct connect, Ethernet (e.g., twisted pair 10/100/1000 Base T), Transmission Control Protocol/Internet Protocol (TCP/IP), token ring, IEEE 802.11a/b/g/n/x, etc. Using the network interface 403 and the communication network 409, the computer system 400 may communicate with the user 103 to receive the natural language input 101 from the user.

The communication network 409 can be implemented as one of the several types of networks, such as intranet or Local Area Network (LAN) and such within the organization. The communication network 409 may either be a dedicated network or a shared network, which represents an association of several types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the communication network 409 may include a variety of network devices, including routers, bridges, servers, computing devices, storage devices, etc.

In some embodiments, the processor 402 may be disposed in communication with a memory 405 (e.g., RAM 413, ROM 414, etc. as shown in FIG. 4) via a storage interface 404. The storage interface 404 may connect to memory 405 including, without limitation, memory drives, removable disc drives, etc., employing connection protocols such as Serial Advanced Technology Attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 405 may store a collection of program or database components, including, without limitation, user/application 406, an operating system 407, a web browser 408, and the like. In some embodiments, computer system 400 may store user/application data 406, such as the data, variables, records, etc. as described in this invention. Such databases may be implemented as fault-tolerant, relational, scalable, secure databases such as Oracle® or Sybase®.

The operating system 407 may facilitate resource management and operation of the computer system 400. Examples of operating systems include, without limitation, APPLE MACINTOSH® OS X, UNIX®, UNIX-like system distributions (E.G., BERKELEY SOFTWARE DISTRIBUTION™ (BSD), FREEBSD™, NETBSD™, OPENBSD™, etc.), LINUX DISTRIBUTIONS™ (E.G., RED HAT™, UBUNTU™, KUBUNTU™, etc.), IBM™ OS/2, MICROSOFT™ WINDOWS™ (XP™, VISTA™/7/8, 10 etc.), APPLE® IOS™, GOOGLE® ANDROID™, BLACKBERRY® OS, or the like.

Furthermore, one or more computer-readable storage media may be utilized in implementing embodiments consistent with the present invention. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, nonvolatile memory, hard drives, Compact Disc (CD) ROMs, Digital Video Disc (DVDs), flash drives, disks, and any other known physical storage media.

Advantages of the Embodiment of the Present Disclosure are Illustrated Herein

In an embodiment, the present disclosure discloses a method for identifying and extracting one or more Places of Interest (PoI) in a natural language input.

In an embodiment, the method of present disclosure enhances usability of interaction based intelligent systems by dynamically identifying one or more PoI from natural language text utterances given to the interactive systems.

In an embodiment, the method of present disclosure is capable of automatically learning one or more words and semantic interpretations corresponding to each word across a huge set of natural language input samples. As a result, accuracy in identifying the PoI from the natural language inputs constantly improves over time.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise. The enumerated listing of items does not imply that any or all the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary, a variety of optional components are described to illustrate the wide variety of possible embodiments of the invention.

When a single device or article is described herein, it will be clear that more than one device/article (whether they cooperate) may be used in place of a single device/article. Similarly, where more than one device or article is described herein (whether they cooperate), it will be clear that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

REFERRAL NUMERALS

| Reference Number | Description |
| --- | --- |
| 100 | Environment |
| 101 | Natural language input |
| 103 | Natural language processing system |
| 105 | Knowledge repository |
| 107 | Places of Interest (PoI) |
| 201 | I/O interface |
| 203 | Processor |
| 205 | Memory |
| 207 | Data |
| 209 | Modules |
| 211 | Word embedding representations |
| 213 | Part-of-Speech (POS) |
| 215 | Dependency labels |
| 216 | Places of Interest (PoI) tag |
| 217 | Other data |
| 219 | Receiving module |
| 221 | Word embedding retrieval module |
| 223 | POS tagging module |
| 225 | Dependency parsing module |
| 227 | PoI tag assigner |
| 229 | Other modules |
| 400 | Exemplary computer system |
| 401 | I/O Interface of the exemplary computer system |
| 402 | Processor of the exemplary computer system |
| 403 | Network interface |
| 404 | Storage interface |

| Reference Number | Description |
| --- | --- |
| 405 | Memory of the exemplary computer system |
| 406 | User/Application |
| 407 | Operating system |
| 408 | Web browser |
| 409 | Communication network |
| 411 | Input devices |
| 412 | Output devices |
| 413 | RAM |
| 414 | ROM |

What is claimed is:

1. A method for identifying one or more Places of Interest (PoI) in a natural language input, the method comprising:
retrieving, by a natural language processing system, a word embedding representation for each word of one or more words in the natural language input from a knowledge repository associated with the natural language processing system;
tagging, by the natural language processing system, each word with a corresponding Part-of-Speech (POS);
generating, by the natural language processing system, a dependency label for each word based on a dependency parser tree for the natural language input;
assigning, by the natural language processing system, a PoI tag for each word based on the word embedding representation, the POS, and the dependency label corresponding to each word, wherein the PoI tag is one of a Begin PoI tag, an Inside PoI tag, and a non-PoI tag; and
identifying, by the natural language processing system, the one or more PoI in the natural language input based on the PoI tag of each word.

2. The method as claimed in claim 1, wherein the word embedding representation provides semantic and syntactic significance of each word, with respect to context of each word in the natural language input.

3. The method as claimed in claim 1, wherein the dependency parser tree is generated based on dependencies among each word in the natural language input.

4. The method as claimed in claim 1, wherein the dependency label indicates relative significance of each word in the natural language input.

5. The method as claimed in claim 1, wherein assigning the PoI tag for each word is performed using an artificial neural network classifier.

6. The method as claimed in claim 5 comprises training the artificial neural network classifier by performing steps of:
collecting natural language input samples from one or more data sources;
associating each word in the natural language input samples with corresponding PoI tag; and
providing the PoI tag, associated with each word, to the neural network classifier for training the neural network classifier.

7. A natural language processing system for identifying one or more Places of Interest (PoI) in a natural language input, the natural language processing system comprises:
a processor; and
a memory, communicatively coupled to the processor, wherein the memory stores processor-executable instructions, which on execution, cause the processor to:
retrieve a word embedding representation for each word of one or more words in the natural language input from a knowledge repository associated with the natural language processing system;
tag each word with a corresponding Part-of-Speech (POS);
generate a dependency label for each word based on a dependency parser tree for the natural language input;
assign a PoI tag for each word based on the word embedding representation, the POS, and the dependency label corresponding to each word, wherein the PoI tag is one of a Begin PoI tag, an Inside PoI tag, and a non-PoI tag; and
identify the one or more PoI in the natural language input based on the PoI tag of each word.

8. The natural language processing system as claimed in claim 7, wherein the word embedding representation provides semantic and syntactic significance of each word, with respect to context of each word in the natural language input.

9. The natural language processing system as claimed in claim 7, wherein the processor generates the dependency parser tree based on dependencies among each word in the natural language input.

10. The natural language processing system as claimed in claim 7, wherein the dependency label indicates relative significance of each word in the natural language input.

11. The natural language processing system as claimed in claim 7, wherein the processor assigns the PoI tag for each word using an artificial neural network classifier.

12. The natural language processing system as claimed in claim 11, wherein to train the artificial neural network classifier, the processor is configured to:
collect natural language input samples from one or more data sources;
associate each word in the natural language input samples with corresponding PoI tag; and
provide the PoI tag, associated with each word, to the neural network classifier to train the neural network classifier.

13. A non-transitory computer readable medium including instructions stored thereon that when processed by at least one processor cause a natural language processing system to perform operations comprising:
retrieving a word embedding representation for each word of one or more words in the natural language input from a knowledge repository associated with the natural language processing system;
tagging each word with a corresponding Part-of-Speech (POS);
generating a dependency label for each word based on a dependency parser tree for the natural language input;
assigning a PoI tag for each word based on the word embedding representation, the POS, and the dependency label corresponding to each word, wherein the PoI tag is one of a Begin PoI tag, an Inside PoI tag, and a non-PoI tag; and
identifying the one or more PoI in the natural language input based on the PoI tag of each word.

* * * * *